3,234,533
SYSTEM FOR DISPLAYING AND
REGISTERING SIGNALS
Pierre Roger Poli, Paris, France, assignor to International
Standard Electric Corporation, New York, N.Y., a corporation of Delaware
Filed May 31, 1962, Ser. No. 198,865
Claims priority, application France, June 7, 1961,
864,135, Patent 1,303,478
7 Claims. (Cl. 340—213)

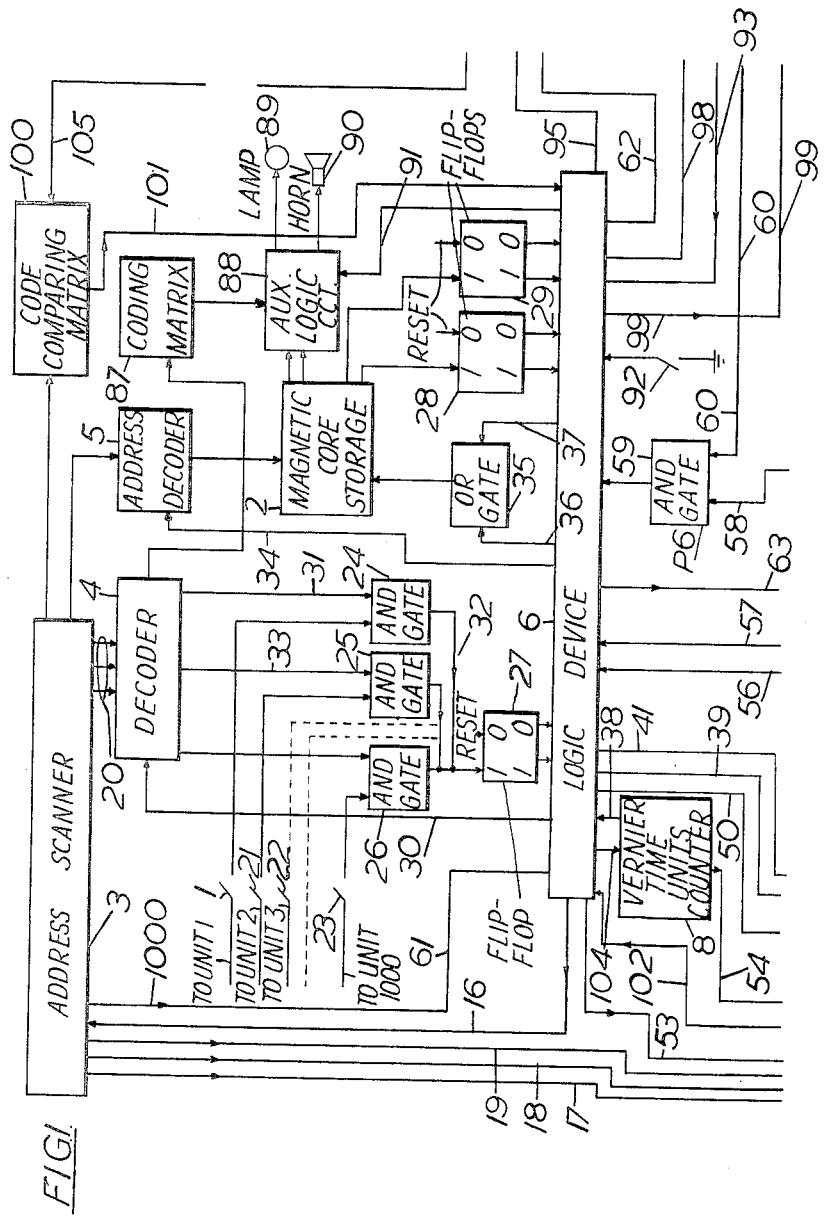

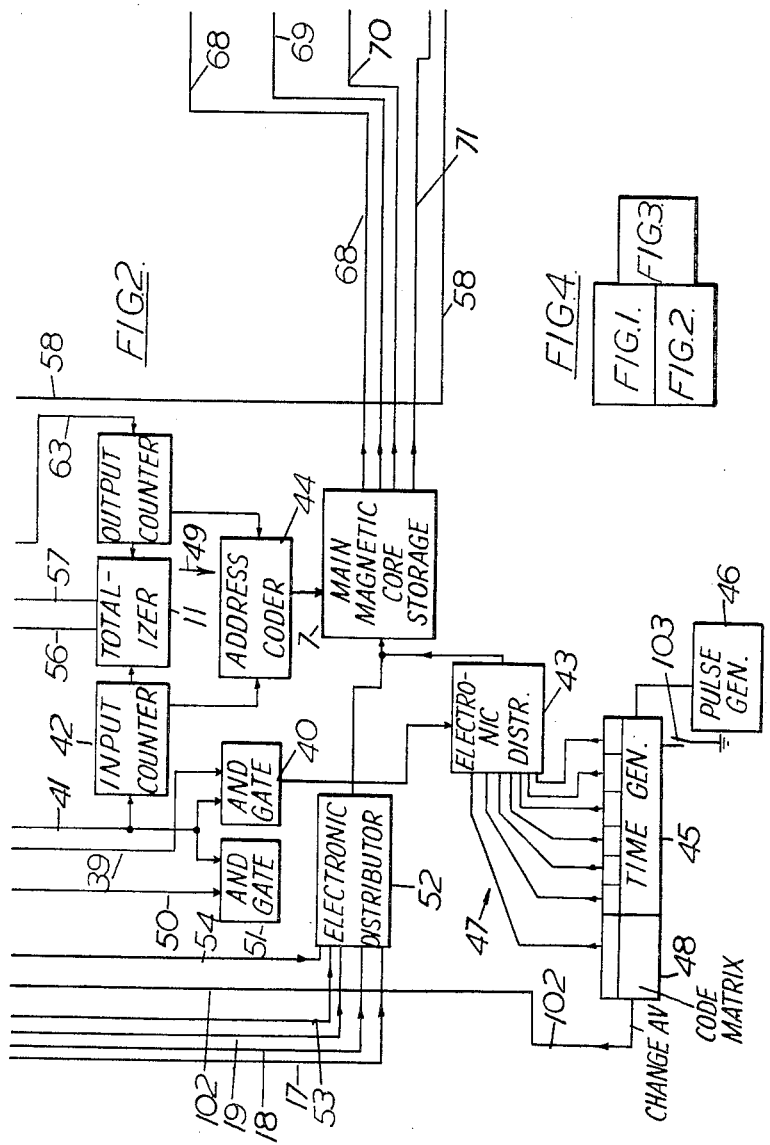

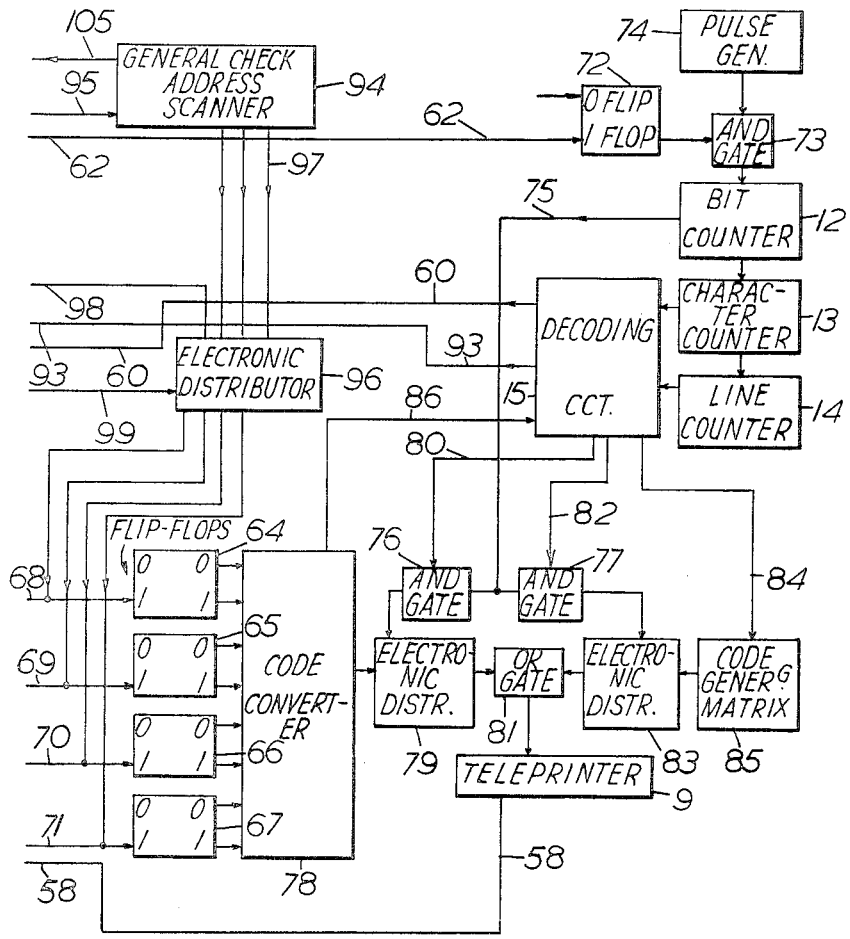

The present invention relates to a system for displaying and registering signals and more particularly to electronic systems adapted to monitor the condition of a relatively large number of individual supervised units.

The invention applies to the supervisor of complex installations, such as electrical power transformation and distribution plants and to industrial production plants which are automatically or semiautomatically operated. These installations consist of a great number of individual units which are able to assume one of two distinct conditions at any given time. For example, the individual monitored units might be circuit breakers, valves or production-line equipment etc. The two distinct conditions which any individual unit might assume might be, for example, open or closed, or engaged or disengaged. Any changes in the condition of any of the individual units must be brought to the attention of an attendant by aural and visual signals. In addition, any changes in the condition of the individual units must be registered in permanent form with the expectation that there will be a later detailed examination of the record by the operating staff.

Signalling the occurrence of a changed condition of one of the monitored units is not a problem and can be easily effected by electromechanical means. However, registering and displaying the signals which represent changes in condition of the monitored devices are more difficult. The changes in condition of the monitored devices may occur at indefinite times and in an uncertain sequence. The prior-art system have typically provided an individual register for each monitored unit. Thus, the prior-art systems have employed a recording pen and a moving roll of tape upon which the pen writes for each individual monitored unit. Such a system has the disadvantages of great bulk and high cost of apparatus.

An object of the present invention is to provide a system for displaying and registering signals which overcomes the above-mentioned and other defects of the prior art.

Another object of the present invention is to accurately record in relative time sequence the occurrence of rapid changes in condition of numerous monitored units.

Still another object of the present invention is to monitor the condition of a large number of individual supervised units with one set of equipment having only one relatively slow permanent registering apparatus, and in addition to provide prompt visual and/or aural warning signals when any monitored unit changes condition.

Another object of the present invention is to provide an automatic routine for performing a general check during which every monitored unit is automatically interrogated and its condition recorded.

One of the features of the present invention is to provide a system for display and storing of signalling operations, in which all the monitored units whose changes of condition must be signalled are interrogated successively and continuously by an address scanner. At the same time, a first buffer storage furnishes information on the previous condition of each interrogated unit. There is provided means to compare the previous condition of each interrogated unit with the present condition of the same unit. If the previous condition of any given unit and the present condition of the same unit are the same, the apparatus passes to the interrogation of the next following unit.

It is a further feature of the invention to provide means to detect the fact that the previous condition of an interrogated unit is different from the present condition of the same unit. Upon the detection of this changed condition, apparatus is provided which causes the registration in a second buffer storage of all the information useful to recording the change of condition of the interrogated unit. There is provided apparatus for later extracting from the second buffer storage, at a convenient moment, the information on the change of condition of the given unit. There is also provided a continuously registering apparatus for producing a permanent record of all the changes of condition of all the monitored units. At a convenient moment, the apparatus for extracting the previously recorded information sends this information to the permanent registering mechanism.

It is another feature of the invention to provide apparatus which, upon the detection of a change of condition of a given unit, provides in permanently recorded form the number of the unit, the present condition of the unit, and the time of occurrence of the change in condition of the unit.

Another feature of the invention lies in the fact that, when a first discordance appears, the complete time digits (hour, minute, second) are stored first in the second buffer storage, and a vernier-time-units counter is started simultaneously. The units of the vernier-time-unit counter are only a fraction of the lowest unit given by the time generator. Then the characters which make up the signalling operation itself are stored in the second buffer storage, the signalling operation including the indication of the position of the venier-time-units counter. The discordances occurring later causing only the registration of the position of the vernier-time-unit counter for the corresponding signalling operation excluding the time given by the time generator. Operation continues in this manner as long as the vernier-time-units counter is not restored to its idle position. In this manner, the apparatus allows a succession of swift phenomena to be analyzed without burdening the permanent message-storing apparatus by systematically sending complete time signals.

According to another feature of the invention, the apparatus for permanently registering the signals is a telegraph page printer for printing on sheets of paper. There is provided a succession of counters which respectively count the different characters which make up a complete signalling operation. Likewise, additional counters count up the different signalling operations which enter into the same printed line. Apparatus is provided for starting the printing when the second buffer storage contains signals. The above-mentioned counters order either the reading of a code from the second buffer storage for the conversion into a corresponding telegraph character or the formulation of a suitable paging code according to the arrangements provided for the printing of various signals.

A further feature of the invention is the provision of apparatus which enables a general check to be effected on the condition of all of the supervised units. A separate second address scanner utilized for the purpose of general checking designates one by one the units whose condition must be made known and furnishes directly the number of each unit to the printing apparatus. In addition, equipment is provided which allows the main address scanner to record the appearance of any discordance entailing the temporary interruption of the general checking. During the general check operation, the condition taken by each unit is read during the course of a normal unit scanning cycle of the main address scanner. However the main address scanner does not stop working and the main address scanner in conjunction with the second buffer storage temporarily registers, until the printing is over, the appearance of any discordance entailing the temporary interruption of the general checking. When the teleprinter is finished printing the general check operations, the discordance signals are extracted from the second buffer storage and printed out on the teleprinter as in the normal course of operation.

According to another feature of the invention when the day changes on the time generator, an order for transmitting the time is given by means of a flip-flop which replaces the circuits for checking discordance. The flip-flop causes the time to be registered in the second buffer storage even when there is no change of condition of the scanned units and even if the vernier time counter has left its rest position. The vernier time counter is restored to the 00 position by control apparatus.

Another feature of the invention is the provision of restoring circuits to operate in event of a power failure. If there is a current failure, the restoring circuits bring all of the units of the apparatus back to zero, empty both buffer storages and place in a particular condition the time generator. The restoring circuits then cause the transmission of a time signal involving the inscription of special characters to substitute for the usual time signals until the time generator is manually set back on time.

The above-mentioned and other features and objects of this invention will become more apparent by reference to the following description taken in conjunction with the accompanying drawings, in which:

FIGS. 1, 2, and 3 illustrate a schematic diagram in block form of a system in accordance with the principles of this invention; and FIG. 4 is a block diagram which illustrates the relationship between FIGS. 1, 2, and 3.

Each of the monitored units that may send a signal has a contact such as 1 which is an interlock contact indicating the condition of this particular unit. The unit may be opened or closed, engaged or disengaged, etc. The open condition of the contact corresponds to one condition of the unit, and the closed condition of the contact corresponds to the other condition of the unit. Each of the monitored units is also served by a group of magnetic cores which are included in the first magnetic core storage 2 for registering the previous condition of the unit when it was interrogated during the preceding scanning cycle.

An address scanner 3 operates to select successively the contact such as 1 of a particular monitored unit by means of a decoder 4. The address scanner 3 is also coupled to an address decoder 5, which selects the corresponding registering cores in core storage 2 which are associated with a particular monitored unit. There will also be transmitted to the logic device 6, the present condition of the monitored unit and the previous condition of the unit which occurred during the preceding scanning cycle.

If the present condition of the particular unit and the previous condition of the same unit are in concordance, the logic device 6 causes only renewal of the registering of the particular condition in the magnetic core storage 2, at the same location in the storage 2. If a discordance is revealed between the present condition of a unit and its previous condition, a signalling operation must be printed by the teleprinter. Since the operating speed of the teleprinter 9 (FIG. 3) compared to that of the electronic equipment is rather slow, the invention provides for the entry of the signals in the second buffer storage 7 (FIG. 2).

Each signalling operation must include: the number of the particular interrogated unit, an indication of the condition it has just assumed, and items of time information. The number of the unit and its present condition can be obtained respectively from the address scanner 3 and the logic device 6. The time items of information will be furnished by a vernier-time-units counter 8, and will constitute relative time information having for a base a complete time inscription previously performed. In order to avoid writing down the complete time notation at each signalling operation, provision is made to register a time precise only to the second and to start a vernier time counter 8 which measures 150 microsecond units (for example) and displays them as two digits. This vernier time indication constitutes the time information which completes any signalling operation (including the first which will be 00), while the complete time indication itself will no longer be registered when subsequent signalling operations come in as long as the vernier time counter 8 has not restored to position 00.

The vernier-time-units counter 8 can be compared to a vernier seconds hand that would be started at the first signalling operation and would then accomplish a complete revolution. Thus, there can be analyzed a sequence of phenomena occurring in rapid succession in a way which allows the analysis of one incident out of the entire sequence without burdening the time registration apparatus by repetitive sending of the complete time signals.

Thus, at the moment when a first discordance appears the logic device 6 orders the registration in the main magnetic-core storage 7 of a signalling operation concerning the particular unit which has exhibited discordance. Also at the same time, there will be registered in the magnetic core storage 2 the new condition assumed by this last interrogated unit so as not to renew the signalling operation during the following scanning cycle.

Therefore, the main magnetic-core storage 7 accumulates, as the signals arrive, the significant information which must be printed by the teleprinter 9 (FIG. 3). This information stored in the storage 7 is not sufficient for complete printing on pages and will be completed by paging characters produced by a code-generating matrix 85 (FIG. 3).

A totalizer 11 (FIG. 2) is associated with the storage 7. The totalizer 11 provides an indication as to how full the main storage 7 is, and also provides an indication for detecting the arrival of a first signalling operation in order to start the teleprinter 9. A counting chain composed of a bit counter 12 (FIG. 3), a character counter 13, and a line counter 14 allows the equipment to follow the printing operation by the teleprinter 9. The counting chain working in cooperation with the decoding circuit 15, provides for the opportune insertion of appropriate paging codes to operate the teleprinter 9. The above is a general description of the operation of the system. More description will be given below on the detailed operation such as audible and visual signalling operations, general checking routine, provisions for current failure, etc.

The different electronic units employed are well known in the art and currently used. The logic device 6 is made up of a group of conventional electronic circuits, such as flip-flops, gates, multivibrators, binary comparators, and counters, arranged so as to constitute a program for the operation of the whole system and particularly for the circuit which scans the units. The logic device 6 also contains well known circuits for processing information.

The logic device 6 also furnishes the time base for the apparatus and orders the stepping of the address scanner 3 by means of signals on the wire 16.

The address scanner 3 can be in a well known and currently used way made up of a chain of flip-flops arranged as a counter. In addition, the address scanner 3 has internal code-converting circuits which convert the binary output of the counter chain into three decimal digits coded in binary notation. Each of the three binary-coded decimal digits will consist of four bits of binary data. There will thus be a total of 12 bits available on three output lines to represent the number of each unit in the system. For example, the unit numbered 963 would be represented on the three leads 17, 18, 19 as 1001, 0110, 0011. The binary-coded decimal digits representing the number of the particular unit which is being interrogated at the moment will also be sent to the decoder 4 on the lines 20. The address scanner 3 thus consists of a binary counting chain, a code converting matrix, and any temporary storage devices, such as flip-flops, which are needed to store the binary coded decimal digits in parallel form. There are also provided circuits within the address scanner 3 to allow the binary bits of each binary-coded decimal digit to be delivered in serial manner when the leads such as 17, 18, and 19 are successively scanned by an electronic distributor 52 (FIG. 2) which will be described later.

The devices which are to be monitored are shown as each having a contact such as 1, 21, 22, etc. up to contact 23 which would represent the contact for the one-thousandth unit, if for example, the capacity of the system was 1000 separate units. The contact of each unit is connected to a respective AND gate. Thus contact 1 for the first unit is connected to AND gate 24. The contact 21 of the second unit is connected to AND gate 25, and the contact 23 of the one-thousandth unit is connected to a one-thousandth AND gate denoted as 26. Only a few of the contacts and the AND gates have been shown for purposes of illustration. Thus, each of the contacts 1, 21, 22 up to 23 has an associated AND gate such as 24 through 26. In a full system, there will be 1,000 individual units each having a contact, and 1,000 AND gates, one AND gate associated with each of the contacts.

During the time when the order for stepping is given on wire 16 to the address scanner 3, the logic device 6 restores to 0 position the flip-flops 27, 28, and 29 as well as some of its own internal circuits used in connection with the unit which was scanned previously. The "set to 0" connections from the logic device 6 to the various flip-flops are simply shown as a "reset" lead entering the flip-flops at the 0 input. A moment later by means of wire 30, the logic device 6 orders the selection of a unit to be interrogated. The decoder 4 then selects a particular unit such as 1, 21, 22, etc. depending upon the position of the address scanner 3. For example, when it is desired to select the first unit, the address scanner 3 is stepped into the position corresponding to contact 1, and the decoder 4 will provide an output on lead 31 to provide an enabling gating input on one lead to the AND gate 24. The other input to the AND gate 24 is the contact on unit 1. If the unit 1 is in the closed condition, the closed contact 1 will provide a second input to the AND gate 24. The AND gate 24 will then provide an output at 32 to place the flip-flop 27 in the set state. However, if the contact of unit 1 is in the open or unoperated condition, the AND gate 24 will have no output at 32, and the flip-flop 27 will remain in the reset condition, that is, the 0 condition. Likewise, depending on the number of the particular unit to which the address scanner 3 has stepped, the decoder 4 will energize a corresponding AND gate. Thus, if the address scanner has stepped to the second unit, the decoder 4 will provide an output on lead 33 to provide one input to the AND gate 25. The AND gate 25 will then have an output or not depending upon whether the contact 21 of the second unit is closed or open. For convenience of illustration, it will be assumed that the first unit is the unit being interrogated at the moment. When the first unit is being interrogated, the condition of the flip-flop 27 represents the present condition of the first device as indicated by contact 1.

Next by means of the wire 34, the logic device 6 sends an enabling order to the address decoder 5. The address decoder 5 receives the output of the address scanner 3 and converts it into appropriate selection signals to select the appropriate storage locations in the magnetic core storage 2. The address decoder 5 selects two cores of the magnetic-core storage 2 associated with the particular unit which is being interrogated, in this case unit number 1. The condition of these two selected cores is given to respectively the flip-flops 28 and 29 and represents the condition that the interrogated unit had assumed during the preceding scanning cycle. Thus, the present condition of the interrogated device is now represented on flip-flop 27 whereas the previous condition of the interrogated unit is now represented on the flip-flops 28 and 29.

The logic device 6 now compares the two pieces of information it has just received. The two pieces of information may be in concordance or in discordance. By concordance is meant the situation where the previous condition of the interrogated unit during the previous scanning cycle as represented on flip-flops 28 and 29 is the same as the present condition of the same interrogated unit as now represented on the flip-flop 27. By discordance is meant the situation where the previous state of the interrogated unit as represented on the flip-flops 28 and 29 is now changed from the present condition of the unit as represented on the flip-flop 27. Thus, if the unit interrogated has not changed in condition since the last scanning cycle, a concordance will result. However, if the interrogated unit has changed condition since the last scanning cycle, a discordance will result. The logic device 6 has a binary comparator circuit to perform the comparison of the conditions represented on the flip-flops 27 and 28 and 29. The outputs of the binary comparator go to OR gate 35 by means of leads 36 and 37. If the present condition of the interrogated unit represents a concordance, then by means of lead 36 and the OR gate 35 the same piece of information is registered anew in the magnetic core storage 2 at the same address which was selected by the order of wire 34, by address decoder 5, the address scanner 3 still not having shifted position.

Thus, if the present condition of the interrogated unit has not changed, this data is simply re-recorded at the same address in the magnetic-core storage 2. After this re-recording operation, the logic device 6 orders the stepping of the address scanner to te next unit to be interrogated by means of the step lead 16. The same operation is then repeated for the next unit to be interrogated. The address scanner 3 will thus successively interrogate the units one by one in a step-by-step fashion.

However, assume that a discordance is detected by the logic device 6. In other words, assume that the present condition of the interrogated unit is different from the previous condition of the same interrogated unit. Now a signalling operation must be registered in the main magnetic-core storage 7 (FIG. 2) before being transcribed by the teleprinter 9 (FIG. 3). This is so because discordance represents a change in condition of one of the monitored units, and at every change of condition it is desired ultimately to cause the teleprinter 9 to print the number of the unit which changed condition, the time of occurrence of the change of condition, and the condition that the unit has now assumed. In cases where a discordance is noted by the logic device 6, two distinct situations must then be considered: (1) either the vernier time counter 8 is in position 00 and the signalling operation must be preceded by a complete time indication or (2) the counter 8 is in course of operation, and no more than the signalling is required.

First will be considered the case where the vernier time counter 8 is at the 00 position. A special output lead 38 of the counter 8 corresponding to the condition that the counter 8 is in the position 00 enables the logic device 6 to know that, in the event of a discordance, it must first register the complete time indication in the main magnetic-core storage 7 (FIG. 2). The output from lead 38 sets in position a flip-flop (not represented) that is part of the logic device 6 which furnishes an enabling gate signal on lead 39. The output on the lead 39 provides an enabling gate signal for the AND gate 40 (FIG. 2). The logic device 6 next provides a train of pulses transmitted from the logic device 6 on the lead 41 simultaneously causes stepping of an input counter 42 and an electronic distributor 43.

Each state of the input counter 42 defines, in conjunction with an address decoder 44, a location in the main magnetic-core storage 7, which can register four bits of information. These four bits corresponding to the four bits needed for each binary coded decimal digit. Each time the logic device 6 sends a pulse on the lead 41 the input counter 42 steps once representing one decimal digit. The address decoder 44 likewise steps once for each pulse on the input lead 41 and defines a new set of four cores corresponding to each new decimal digit which is to be stored in the main magnetic-core storage 7. Thus, the input counter 42 keeps a running total of the number of decimal digits which have been entered into the main magnetic-core storage 7. The train of stepping pulses on the lead 41 from logic device 6 also passes through the AND gate 40 to the electronic distributor 43 and causes the successive stepping of the electronic distributor 43. The electronic distributor 43 enables the codes produced by the time generator 45 to be applied successively to the core storage 7.

The clock, or time generator 45, can be made up of a chain of binary counters that receive an impulse once every second from the pulse generator 46. The time generator 45 supplies in binary code six decimal digits, indicating the second, the tens of seconds, the minute, the tens of minutes, the hour, and the tens of hours. For example, 11:23:49 indicates the eleventh hour, twenty-third minute, and 49 seconds. The outputs of the time generator 45 by means of leads 47 are introduced into the input of the electronic distributor 43. Thus, the time generator 45 produces one binary-coded decimal digit consisting of four bits on each one of the six leads 47. The time generator 45 also includes a fixed code matrix 48 which generates a steady code of a non-numerical combination which is registered first in the core storage 7 and provided for announcing that time signals will follow. The time generator 45 provides the four bits of each decimal digit in serial form. The stepping pulses on the lead 41 from the logic device 6 pass through the AND gate 40 to cause the electronic distributor 43 to successively enter the characters generated by the time generator 45 and the code matrix 48.

The registration of the seven codes from generator 45 and matrix 48 is done in seven cycles defined by the logic device 6, which essentially comprises the application of a pulse on wire 41 for selecting a place in the core storage 7 by input counter 42 and address decoder 44 for the signal to be introduced therein by the electronic distributor 43. There then follows the application of an order pulse on lead 49 from logic device 6 to cause the registration in the storage 7. The pulse from the logic device 6 on lead 49 orders the registration of the data from the electronic distributor 43 in the core storage 7. When the seven cycles are over, that is, when all the information from the code matrix 48 and the time generator 45 have been added into the core storage 7, the electronic distributor 43 sends a signal to the logic device 6 which causes a flip-flop within logic devices 6 to change from the state of providing an output on lead 39 into the state providing an output on lead 50. This enables one input lead of the AND gate 51. With an enabling signal on the input lead 50, a train of pulses on the lead 41 can now pass through the AND gate 51 and cause the stepping of the electronic distributor 52 instead of the electronic distributor 43. The electronic distributor 52 is of exactly the same construction as the electronic distributor 43. The AND gate 40 is now non-conducting since there is no input on the lead 39 and the electronic distributor 43 no longer functions.

The function of electronic distributor 52 is to switch into the core storage 7 three binary-coded decimal digits which indicate the number of the particular unit which has been interrogated. These three binary coded decimal digits appear on the leads 17, 18, and 19 and are supplied by the address scanner 3 as mentioned previously. The use of three binary-coded decimal digits allows a maximum capacity of 1,000 individual units to be monitored. There is also supplied to the electronic distributor 52 one code coming from the logic device 6 on lead 53 which indicates the present condition assumed by the interrogated unit and two codes supplied on the lead 54 by the vernier time-units counter 8 and indicating the present time. These last two binary-coded decimal digits indicate the present position of the vernier time-units counter 8. Thus, as inputs to the electronic distributor 52 there is a total of six codes on the input leads 17, 18, 19, 53, and 54. These indicate the number of the interrogated unit, its present condition, and the present reading of the vernier time-units counter 8.

To enter these six codes into the core storage 7, the logic device 6 provides a train of six stepping pulses on the lead 41, which pass through the AND gate 51 and cause the stepping of the electronic distributor 52. Simultaneously, the train of pulses on the lead 41 causes the stepping of the input counter 42. When the six codes have been entered by electronic distributor 52 in core storage 7, the electronic distributor 52 indicates by a lead to the logic device 6 that the entry of the information is over. The address scanner 3 has still not shifted position. The logic device 6 then orders by means of lead 34 the entry into the core storage 2 of the data on lead 37 which passes through OR gate 35 into core storage 2. The data on lead 37 represents the new condition of the interrogated unit and will be used on the next cycle of scanning. The lead 37 represents the output of the binary comparator contained in logic device 6 when a discordance was detected concerning the condition of the interrogated unit. Thus, the core storage 2 will now contain the new data representing the correct present condition of the interrogated unit for use on the next scanning cycle. After this piece of information has been stored in storage 2, the logic device 6 orders the stepping of the address scanner 3 and the operation proceeds in the same manner to cause the interrogation of the next unit.

It will be noted that the above described sequence was for the condition where the vernier time-units counter 8 was in the 00 position. This corresponds to the occurrence of the first signalling operation, that is the occurrence of the first discordance that was detected. Now the registration of the time and the information concerning this first signalling operation is over. During this time, the logic device 6 has set in operation an auxiliary time base contained within logic device 6, which is concerned with ordering every 150 microseconds the stepping of the vernier time units counter 8. This stepping order on lead 104 for the counter 8 can be synchronized with the order to step the address scanner on wire 16 so as to avoid all shift of reading of counter 8 during the registration of a signalling operation. The complete sequence of interrogating one unit and registering the time and the number of the unit and its present condition and the reading of the vernier counter 8 will all take approximately 50 microseconds. Thus there is plenty of time during one unit of counting by the vernier counter 8 to register all the required information concerned with the interrogation of one unit.

Next to be considered is the second possibility which was mentioned, namely, that when the discordance occurs, the vernier time units counter 8 is not in the 00 position but has some particular time indication. Since the counter 8 furnishes a time indication which allows the complete time date to be reconstructed, it is not necessary to register the complete hour, minute, and second time signal, but it is only necessary to register the vernier time indication from the vernier time counter 8. If a discordance occurs when the vernier counter 8 is out of its rest position, there will be no input on lead 38 which indicated the 00 position. Logic device 6 then furnishes an enabling signal on the lead 50, and the AND gate 51 is enabled. Logic device 6 then furnishes a train of stepping pulses on the lead 41 which passes through the AND gate 51 and causes the electronic distributor 52 to enter the number of the interrogated unit, its present condition, and the two codes representing the vernier time reading from the vernier time counter 8. The AND gate 40 is non-conducting and the electronic distributor 43 is not used at all in this event. Thus, there is stored in the core storage 7 the number of the unit, its present condition, and the vernier time reading. When the electronic distributor 52 has finished scanning, the end of the registration in the core storage 7 has been reached. The logic device 6 then orders the address scanner 3 to step to the next unit, and the interrogation proceeds in the same manner. This same sequence will apply for all the signalling operations that occur during the operation of the vernier counter 8. When the counter 8 reaches the position 00, the appearance of a new discordance will determine as previously seen, the complete registration of the complete time signals by use of electronic distributor 43 and so on.

The operations which have just been described are accomplished solely by electronic units whose operating speed is very high. In the case of no discordance, a scanning time of only 50 microseconds per interrogated unit can be obtained. Thus, there will be a total of 50 milliseconds of time taken for the scanning of the 1,000 units which can be handled. This period of time is increased very slightly when discordance appears during the scanning operation.

To summarize the operations which have been described so far, very briefly: address scanner 3 successively interrogates the monitored units. As each unit is interrogated its present condition is compared with its past condition by the logic device 6 through use of the core storage 2 and the flip-flops 27, 28 and 29. If the interrogated unit has not changed condition since the last scanning cycle (concordance) the address scanner 3 is stepped to interrogate the next unit. However, if an interrogated unit has changed condition since the last scanning cycle (discordance), then the number of the unit and its present condition, and a time indication are entered into the magnetic-core storage 7. The time indication which is entered into the core storage 7 depends upon whether the vernier time counter 8 is in its 00 position or is in operation. The result is that any discordance which has occurred becomes registered in the magnetic-core storage 7 with the number of the unit, its present position, and the time indication.

There will next be described operation of apparatus whose purpose is to obtain a display of the previously mentioned signals on a page type teleprinter. An output counter 55 is associated with the core storage 7 in addition to an input counter 42. The output counter 55 steps once each time a code is extracted from the core storage 7. The readings of the input counter 42 and the output counter 55 are compared by means of a totalizer 11. When the core storage 7 is empty, the counters 42 and 55 have the same reading, and the totalizer 11 indicates to the logic device 6, by means of a signal on the wire 56, that there is nothing in the core storage 7. As soon as a piece of information enters the core storage 7, the totalizer 11 leaves the reading 00 and transmits the corresponding indication into logic device 6 by means of wire 57. The signal on the lead 57 thus indicates to the logic device 6 that there is information in the storage 7 which has not yet been printed out by the teleprinter 9.

To be able to use the teleprinter, two conditions are necessary. First, the teleprinter must be idle and, secondly, the teleprinter must not be engaged in a paging operation, such as line feed, carriage return, etc. If the teleprinter is idle, this condition is indicated by a signal on the lead 58 as an input to the AND gate 59 (FIG. 1). The other input to the AND gate 59 is lead 60 from decoder 15. If the teleprinter is not engaged in paging operations, there will be a signal on the lead 60. Thus, if the two conditions indicating that the teleprinter is receptive to printing are present, the AND gate 59 produces an output to signify this condition to the logic device 6. When logic device 6 receives the output from AND gate 59, it is then possible to extract a code from the core storage 7 for its display by the teleprinter 9. A time position determined by the address scanner 3 is allotted to this operation. For example, when the address scanner 3 arrives into count number 000, the logic device is informed by means of lead 61 which indicates that the address scanner is in the 000 count position. Then the logic device 6 does not make the discordance test, and the starting of the teleprinter is ordered by the lead 62 (FIG. 3).

Then, by means of lead 63 (FIG. 2), the logic device 6 orders the stepping of the output counter 55. Then, by means of lead 49, the logic device 6 orders the reading of a core-storage location in core storage 7 defined by the position of the output counter 55 by means of the address decoder 44. The four bits of data representing one decimal digit contained in the selected place in core storage 7 are sent to the reading flip-flops 64, 65, 66, and 67 (FIG. 3), one flip-flop being used for each of the four bits. The four outputs 68, 69, 70, and 71 of the core storage 7 are connected to the flip-flops 64, 65, 66, and 67, as indicated. Thus, the four binary bits representing one binary-coded decimal digit are sent from the core storage 7 to the reading flip-flops 64, 65, 66, 67 in parallel and are registered in the reading flip-flops for subsequent use by the teleprinter apparatus. This same procedure is used for each character which is read out of the core storage 7 and sent to the four reading flip-flops 64 through 67. (Refer to FIG. 3.) The logic device 6 gives the signal to start the teleprinter by means of a signal on leads 62 which sets the flip-flop 72 into position. The flip-flop 72 supplies an enabling input to the AND gate 73. A pulse generator 74 supplies a train of pulses as the second input to the AND gate 73. The train of pulses from pulse generator 74 is applied to the counting chain 12, 13, and 14. The pulse generator 74 produces pulses at a rate appropriate to the stepping rate for operating the teleprinter 9. The bit counter 12 counts the seven telegraphic unit elements which make up a telegraph character, namely, START, five information bits and STOP. The character counter 13 counts the characters written by the teleprinter 9 and constitutes groups of nine characters which are themselves counted by the line counter 14. The line counter 14 is designed to allow seven blocks of nine characters per line, that is, 70 characters per line, which corresponds to the capacity of the line counter 14.

The counter 12 also provides an output of one pulse per bit on the lead 75 to the AND gate 76 and also to the AND gate 77. The sending of code signals to the teleprinter 9 is accomplished in the following way. The code read from the core storage 7 is stored in parallel by the flip-flops 64 through 67 and translated into telegraph code by the code converter 78 which displays the code upon the bit element allotter 79. The bit element allotter 79 is similar to an electronic distributor. AND gate 76 is provided with an enabling signal by the decoder 15 on lead 80. Then the telegraphic time-base pulses provided by the bit counter 12 pass through the AND gate 76 to the bit allotter 79. The telegraph codes pass through the OR gate 81 to the teleprinter 9.

The printed characters are counted by the character counter 13 and the line counter 14. The reading of these counters is sent to the decoding circuit 15. If the reading assumed by the counters 13 and 14 after the printing of a character coming from store 7 corresponds to a paging character (space, dash, carriage return, line feed, etc.) the decoding circuit 15, instead of rendering the AND gate 76 conducting, sends an enabling signal to the AND gate 77 by means of lead 82. The signal on lead 82 allows the train of telegraphic time-base pulses from lead 75 to pass through the AND gate 77 to a second electronic distributor 83. At the same time, the decoder 15 by means of lead 84 orders the code-generating matrix 85 to supply paging codes to the distributor 83. The code-generating matrix 85 makes up the required paging codes, such as line feed, carriage return, etc. While the paging codes are being inserted from the code-generating matrix 85, the electronic distributor 83 supersedes the electronic distributor 79, and the paging codes pass the electronic distributor 83 through the OR gate 81 to the teleprinter 9.

It should be noted that, while the teleprinter 9 is engaged in paging operations, the decoding circuit 15 by means of lead 60 does not send an enabling signal to the AND gate 59 (FIG. 1). Thus, the AND gate 59 has no output while the teleprinter is engaged in paging operations. This forbids reading the signals contained in the core storage 7 into the teleprinter 9 as long as paging signals are being sent to the teleprinter 9.

The paging codes provided by the code-generating matrix 85 are different depending upon whether a time indication or a signalling operation must be printed. While the signalling operations, that is, a discordance, are written one after the other, line after line, each signalling operation being made up of a block of nine telegraph characters, a time indication must be written alone on one line and contains 12 characters. For this reason, provision has been made to have the complete time signals preceded in the buffer memory by a conventional signal to announce them. This is the reason that the code matrix 48 in FIG. 2 is provided. The reading of this special character by the code converter 78 results in the application of a signal on the line 86 to inform the decoding circuit 15 that a time signal is about to be entered into the teleprinter from the core storage 7. This signal on the wire 86 informs the decoding circuit 15 that paging codes must be injected to place the following time signal on a line by itself. This special character itself is not printed by the teleprinter, the AND gates 76 and 77 both remaining open during the time that the code converter 78 is reading this special character.

Next will be considered the visual and aural signals that the system must furnish in addition to the display on the teleprinter 9 which has just been described. The visual signal consists in the lighting of a general-alarm lamp 89 (FIG. 1) and the sound signal consists in the sounding of an alarm horn 90. Each of the various monitored units may have one of three different types of alarm methods associated therewith: Namely, (A) no aural or visual alarms; (B) visual signalling but only sound signalling if the detected condition lasts longer than a given period of time; (C) both visual and sound alarms even if the condition is transitory.

For each monitored unit defined by address scanner 3 and the decoder 4, a corresponding signal can be transmitted to the coding matrix 87. The order transmitted from decoder 4 to the coding matrix 87 for any unit defines the alarm method to be adopted regarding this particular unit. For example, unit number 1 may have circuits so set up in the decoder 4 and the coding matrix 87 that no visual or aural alarms will be given at all for number 1. Likewise, unit number 2 might be set up to provide a visual alarm only; and a sound alarm only if the defect in unit 2 lasts longer than a given period of time. Likewise, other units may be set up to provide both visual and sound alarms even if the change of condition in the monitored unit is transitory.

The output of the coding matrix 87 is connected to the auxiliary logical circuit 88. The auxiliary logic circuit 88 has circuits suitable to drive either the lamp 89 or the horn 90 or both, depending upon the type of alarm method desired for a particular unit that is being interrogated.

In addition, for each monitored unit, three magnetic cores within the magnetic cores storage 2 are reserved to accommodate and keep track of the visual and sound alarm conditions. Initially the cores are in the 0 state, that is with no information entered in them. When the logic device 6 detects a fault or alarm condition, it sends a signal by means of wire 91 to the auxiliary logic circuit 88, which orders the lighting of the lamp 89 and, if necessary, the sounding of the horn 90. If the unit which is being interrogated does not necessitate the sounding of the horn for a transitory alarm, the logic device 6 is informed of this fact. Two of the cores reserved for the sound and visual alarm operations are used for counting the number of successive scanning cycles during which the abnormal condition continues. At the first cycle when the fault or alarm is detected, the logic device 6 will order the registering of the data $\underline{01}$ in these two cores. At the next scanning cycle for the same monitored unit, if a new discordance is not noted as an indication that the unit has been restored to its initial condition, the auxiliary logic circuit 88 orders the registering of the data $\underline{10}$ by the logic device 6 in the magnetic-core storage 2. At the third scanning cycle for the same interrogated unit, the count $\underline{11}$ will be registered in the two cores so reserved. At the fourth cycle, the auxiliary logic circuit 88 will note that alarm condition is constant and will order the sounding of the horn 90. However, if during the course of these three scanning cycles, the interrogated unit returns to its initial condition, the two cores are restored to the state 00. In all cases, the order to sound the horn 90 given by auxiliary logic circuit 88 is given to the logic circuit 6, which then orders the shifting of the third core into the state $\underline{1}$. This third core is likewise located in the magnetic-core storage 2. By storing this condition in the third core, during the following cycles the auxiliary logic circuit 88, when detecting this condition, will not repeat the order for starting the horn 90, thus avoiding sounding the horn for the same alarm condition after the horn has been voluntarily turned off by the operator.

The horn 90 is manually turned off by conventional means, such as a switch and relays. The alarm lamp 89 can be extinguished, for example, when the logic device 6 notes that complete scanning of all the units has been completed without any of the units being found in the abnormal condition. The three signalling cores are set back into initial condition when the particular monitored unit with which they are associated restores to the normal condition.

The system also has provisions for an automatic general check of all of the units. A reduced signalling operation is then printed by the teleprinter for each of the monitored units. The complete time indication is printed at the beginning of the general check, but the signalling operations relating to each monitored unit do not include the time information. Instead there is written down the number of each monitored unit and its present condition with the time indication being omitted. The order to start a general check can be given to the logic device 6 by the manual contact 92 (FIG. 1) which applies a directive potential. The directive to start a general check is registered in logic device 6 but becomes effective only when the magnetic-core storage 7 is empty and the teleprinter 9 is stopped. A flip-flop (not shown) which is part of logic device 6 then changes condition, and accordingly then places the checking circuits within logic device 6 in the discordance condition. Just as when registering a first signalling operation, the logic device 6 orders the storing of the complete time indication in the magnetic-core storage 7. When the electronic distributor 43 has finished its cycle, the logic device 6 begins scanning the next unit. The signal remains on lead 39, but the complete time indication need not be stored again during the rest of the general check. The complete time indication stored in core storage 7 is transcribed by the teleprinter 9. When the decoding circuit 15 notes that the complete time indication inscription has terminated, a signal is sent to the logic device 6 over wire 93. This signal, which is not normally utilized, is registered in logic device 6. Then another item of data returns to decoding circuit 15 in order to indicate to the decoding circuit 15 that a general check is beginning and to order the change in the paging operation.

The general check operation is achieved by means of a second address scanner 94 devoted entirely to this use. The address scanner 94 is similar to the address scanner 3. The address scanner 94 is caused to step by a signal on lead 95 from logic device 6. After receiving the signal on wire 93 from decoding circuit 15, which indicates that the operation of storing the time indication is complete, the logic device 6 orders the stepping of the address scanner 94 into the next position. The reading, or position, of the address scanner 94 is displayed on the inputs 97 of an electronic distributor 96. The electronic distributor 96 is of the same type as the electronic distributors 43 and 52. Assume that the address scanner 94 is on unit number "001." If the two condition are present at the AND gate 59, namely, signal 58 indicating the teleprinter 9 is idle and signal 60 indicating that paging operations are not taking place, then the logic device 6 orders the electronic distributor 96 to step once and orders the teleprinter 9 to start by means of lead 62 and the flip-flop 72. The number of the unit being interrogated, namely, 001, is successively transmitted by the electronic distributor 96 to the reading flip-flops 64 through 67 and from there to the teleprinter 9 as previously described. The electron distributor 96 is provided with the number of the particular unit undergoing the general check by the three leads 97. The lead 98 from logic device 6 also provides the condition of the particular unit being interrogated to the electronic distributor 96. Stepping pulses which operate the electronic distributor 96 are provided from the logic device 6 by means of lead 99.

During the time that the number of the interrogated unit is being sent from the electronic distributor 96 into the teleprinter 9, the main address scanner 3 progresses normally. When the address scanner 3 comes into agreement with the address scanner 94, the code-comparing matrix 100 sends an order by means of lead 101 to the logic device 6 which registers the position, that is, the number, of the considered interrogated unit. The condition of the interrogated unit is also sent by the logic device 6 over lead 98 to the banks of the electronic distributor 96, so that, on a fourth cycle, the electronic distributor 96 can transmit the condition of the particular unit (001) into the teleprinter 9 by means of the reading flip-flops 64 through 67. This process is repeated by the stepping of general check address scanner 94 for each of the monitored units in the installation.

If, during the general checking operation, a discordance is noted, that is, if one of the monitored units changes condition, the general checking operation is interrupted. While the general check operation is interrupted, the time and the signalling operation associated with the discordance are normally entered into the core storage 7. The totalizer 11 indicates to logic device 6 that there is a signalling operation to be entered into the teleprinter 9. The logic device 6 waits until the teleprinter 9 has finished printing the last characters for the previous unit undergoing the general check. Then the logic device 6 orders the extraction of the signalling operation from the core storage 7 and printing on the teleprinter 9 as under normal conditions. This continues until the totalizer 11 comes back into the 0 position indicating that all of the data has been transferred out of the magnetic core storage 7. During this time the general check order intended for the decoding circuit 15 is cancelled from the lead 93. When the printing of the discordance operation is over, the general checking operation is resumed as previously.

The system also accommodates other unusual situations. There must be a provision for registering the complete time indication when the day changes. Thus, when the time generator 45 passes from 23H59′59″ to

00H00′00″ this change of condition of the time generator 45 from the end of one day to the start of the next day is signalled to the logic device 6 by means of the lead 102. Upon receiving the signal on the lead 102, the logic device 6 waits until a suitable moment for transmitting the time as it has done for the general check order.

The system also accommodates the condition of a power failure. When the current supply is re-established after a power failure, the logic device 6 passes into such condition that no discordance is taken into consideration for a complete cycle of the address scanner 3. When the address scanner 3 goes through one complete scanning cycle this results in the re-establishment of the memory, that is, the appropriate data, in the magnetic core memory 2. During the complete scanning cycle of the address scanner 3, the output counter 55 also steps each time the address scanner 3 steps. This causes the emptying of the magnetic core storage 7, while the teleprinter 9 is not started, after this, normal operation is resumed. However, the time generator or clock 45 is set into an off numbering position so that the teleprinter 9 will write HHHHHHH instead of the time as long as time generator 45 is no longer on the correct time. This condition will last as long as a manual resetting by means of contacts such as 103 has not been done. In addition, the emission of this fictional time is ordered by the logic device 6 under the same conditions as the transmission of time for a general checking operation or for a change of day.

While the principles of this invention have been described in connection with specific apparatus, it is clearly to be understood that this description is made only by way of example and not as a limitation to the scope of the invention as set forth in the objects thereof and in the accompanying claims.

I claim:

1. A system for monitoring the condition of a plurality of units comprising:
   a logic device;
   scanning means coupled to said logic device repeatedly to successively scan each said unit to derive information representative of the condition of each said unit at each said scan and to feed said information to said logic device;
   first information storage means;
   means coupled to said scanning means for extracting from said first storage means the contents thereof pertaining to the unit whose information is being operated on in said logic device; and
   means coupled to said first storage means for feeding said extracted contents to said logic device;
   said logic device including:
   means for comparing the information from said scanning means with the said contents pertaining to the same unit which were extracted from said first storage means;
   means for emitting signals upon discordance between both said inputs; and
   means for inserting the newly derived information pertaining to said same unit into said first storage means in place of said extracted contents.

2. A system according to claim 1 wherein said extracting means includes an address decoder coupled between said scanning means and said storage means.

3. A system according to claim 1 wherein said means for emitting signals emits signals corresponding to the particular unit exhibiting discordance and the newly assumed condition of said unit.

4. A system according to claim 1 further comprising:
second storage means coupled to said emitting means for storing said emitted signals;
a system output means; and
means coupled between said second storage means and said system output means for causing said information to be transferred from said second storage means to said output means.

5. A system according to claim 4 in which said system output means comprises a teleprinter.

6. A system according to claim 4 further comprising:
means to indicate the time of the occurrence of the discordance; and
means to insert said time of occurrence into said second storage means.

7. A system according to claim 1 further comprising:
a discordance indicating means; and
means to delay indication by said discordance indicating means of a discordance for a plurality of more than two scans of the unit exhibiting the discordance in order to verify the said discordance and to protect against transitory fault indications.

References Cited by the Examiner

UNITED STATES PATENTS

| | | | |
|---|---|---|---|
| 2,564,294 | 8/1951 | Belcher | 340—213 |
| 2,905,520 | 9/1959 | Anderson | 340—213 |
| 3,073,907 | 1/1963 | Alterman et al. | 179—18.6 |
| 3,107,340 | 10/1963 | Silliman et al. | |

FOREIGN PATENTS 822,536   6/1961   Canada.

NEIL C. READ, *Primary Examiner.*